(12) United States Patent
Cheng

(10) Patent No.: US 8,484,557 B1
(45) Date of Patent: Jul. 9, 2013

(54) METHODS AND SYSTEMS FOR DEFINING PREFLIGHT PROFILE RULES

(75) Inventor: Susan Cheng, Seattle, WA (US)

(73) Assignee: Adobe Systems Incorporated, San Jose, CA (US)

( * ) Notice: Subject to any disclaimer, the term of this patent is extended or adjusted under 35 U.S.C. 154(b) by 774 days.

(21) Appl. No.: 12/181,641

(22) Filed: Jul. 29, 2008

(51) Int. Cl.
*G06F 17/00* (2006.01)

(52) U.S. Cl.
USPC ........... 715/249; 715/273; 715/222; 715/234; 707/736

(58) Field of Classification Search
CPC . G06F 17/243; G06F 17/22247; G06F 17/248; G06F 17/211
See application file for complete search history.

(56) References Cited

U.S. PATENT DOCUMENTS

| | | | | |
|---|---|---|---|---|
| 3,580,139 A * | 5/1971 | Rasmussen | ...................... | 91/510 |
| 4,313,201 A * | 1/1982 | Fischer et al. | ................ | 714/820 |
| 4,350,314 A * | 9/1982 | Hoadley | ......................... | 244/1 R |
| 4,351,394 A * | 9/1982 | Enk | .................................. | 169/61 |
| 4,357,814 A * | 11/1982 | Kripner | ........................... | 70/232 |
| 4,382,281 A * | 5/1983 | Fowler et al. | ..................... | 701/3 |
| 4,393,483 A * | 7/1983 | Hammond et al. | ............. | 367/13 |
| 4,463,826 A * | 8/1984 | Pearce | ............................ | 182/20 |
| 4,482,018 A * | 11/1984 | Enk et al. | ........................ | 169/62 |
| 4,489,591 A * | 12/1984 | Myrick | ........................ | 73/1.78 |
| 4,566,542 A * | 1/1986 | Enk et al. | ........................ | 169/62 |
| 4,759,515 A * | 7/1988 | Carl | ............................ | 244/76 R |
| 4,765,193 A * | 8/1988 | Holden et al. | ................ | 73/865.9 |
| 4,779,683 A * | 10/1988 | Enk | .................................. | 169/61 |
| 4,811,255 A * | 3/1989 | Kelly, III | ....................... | 702/147 |
| 4,825,647 A * | 5/1989 | Cann | ............................. | 60/203.1 |
| 4,884,205 A * | 11/1989 | Hernandez-Diaz | ............. | 701/99 |
| 4,899,659 A * | 2/1990 | Hardt | ............................. | 102/229 |
| H833 H * | 11/1990 | Brindle | ............................ | 2/424 |
| 5,020,108 A * | 5/1991 | Wason | ........................... | 704/226 |
| 5,245,255 A * | 9/1993 | King | .............................. | 318/34 |
| 5,247,843 A * | 9/1993 | Bryan | ............................ | 73/865.6 |
| 5,265,024 A * | 11/1993 | Crabill et al. | ................. | 701/538 |
| 5,272,906 A * | 12/1993 | Bowers, Jr. | .................... | 73/1.58 |
| 5,322,415 A * | 6/1994 | White et al. | .................. | 416/143 |
| 5,428,358 A * | 6/1995 | Gardner | ...................... | 342/26 D |
| 5,449,135 A * | 9/1995 | Henderson | ................ | 244/153 R |
| 5,640,499 A * | 6/1997 | Nagai | ............................ | 345/676 |
| 5,924,965 A * | 7/1999 | Vardy | ............................ | 482/112 |
| 5,971,328 A * | 10/1999 | Kota | ............................. | 244/219 |
| 6,012,070 A * | 1/2000 | Cheng et al. | ................... | 715/234 |
| 6,144,619 A * | 11/2000 | Reisman | ......................... | 368/10 |
| 6,199,008 B1 * | 3/2001 | Aratow et al. | ................ | 701/120 |
| 6,292,830 B1 * | 9/2001 | Taylor et al. | .................. | 709/224 |
| 6,326,962 B1 * | 12/2001 | Szabo | ............................ | 715/762 |
| 6,329,994 B1 * | 12/2001 | Gever et al. | ................... | 345/473 |
| 6,331,861 B1 * | 12/2001 | Gever et al. | ................... | 345/629 |

(Continued)

OTHER PUBLICATIONS

"Enfocus PitStop Professional User Guide," 2001, Enfocus, pp. 1-183.*

(Continued)

*Primary Examiner* — Farhan Syed
(74) *Attorney, Agent, or Firm* — Schwegman, Lundberg & Woessner, P.A.

(57) ABSTRACT

A method includes defining preflight parameters for preflight rules using relationship information. A preflight rule may be associated with an attribute table which may include information about associated preflight parameters. The preflight parameters may be defined via an interface that enables a user to specify data type and parameter relationship information.

19 Claims, 10 Drawing Sheets

U.S. PATENT DOCUMENTS

| | | | |
|---|---|---|---|
| 6,608,697 B1* | 8/2003 | Schorr et al. | 358/1.15 |
| 6,932,090 B1* | 8/2005 | Reschke et al. | 128/898 |
| 7,345,781 B2* | 3/2008 | Beckman et al. | 358/1.15 |
| 7,451,140 B2* | 11/2008 | Purvis et al. | 1/1 |
| 7,499,936 B2* | 3/2009 | Bettendorf | 1/1 |
| 7,640,500 B2* | 12/2009 | Pirie et al. | 715/274 |
| 7,783,972 B2* | 8/2010 | Camps et al. | 715/255 |
| 7,859,689 B2* | 12/2010 | Michel et al. | 358/1.13 |
| 2002/0116399 A1* | 8/2002 | Camps et al. | 707/200 |
| 2004/0034834 A1* | 2/2004 | Pirie et al. | 715/527 |
| 2004/0083430 A1* | 4/2004 | Boonen | 715/523 |
| 2004/0153449 A1* | 8/2004 | Bettendorf | 707/5 |
| 2004/0190043 A1* | 9/2004 | Beckman et al. | 358/1.15 |
| 2005/0028093 A1* | 2/2005 | Michel et al. | 715/526 |
| 2005/0030570 A1* | 2/2005 | Wiechers et al. | 358/1.13 |
| 2007/0002342 A1* | 1/2007 | Morales et al. | 358/1.9 |
| 2007/0016344 A1* | 1/2007 | Stefani | 701/3 |
| 2008/0077573 A1* | 3/2008 | Weinberg et al. | 707/5 |
| 2009/0021757 A1* | 1/2009 | Liu et al. | 358/1.13 |
| 2009/0031216 A1* | 1/2009 | Dressel et al. | 715/255 |

OTHER PUBLICATIONS

Utter, Malin J., "Preflight Evaluation," Jun. 2006, Department of Science and Technology, Linkoping University, Sweden, pp. 1-67.*

* cited by examiner

200

| Key 201 | Data Type 202 | Value 203 |
|---|---|---|
| Parameter A 205 | Integer 32 bits | 2 |
| Parameter B 210 | boolean | TRUE |
| Parameter C 215 | character string | LEFT |
| Parameter D 220 | range | 5-10 |
| . . . | | |
| Parameter N 225 | | |

520 — Document
- ☑ 521
- ☐ Page size & Orientation
- ☑ Number of pages required — At least ▶ 1  522
- ☐ Blank pages
- ☑ Bleed and Slug Setup (Dropdown list example)

510 — Color Spaces and Modes not Allowed
- ☑ 511
- ☐ RGB
- ☑ CMYK
- ☐ Gray
- ☐ Lab
- ☐ Spot Color (Check box example)

500 — Margin
- ☑ 501
- Top: 1p6
- Bottom: 1p6
- Left/Inside: 1p6
- Right/Outside: 1p6

(Edit box example)

METHODS AND SYSTEMS FOR DEFINING PREFLIGHT PROFILE RULES

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in the drawings that form a part of this document: Copyright 2008, ADOBE SYSTEMS INCORPORATED. All Rights Reserved.

TECHNICAL FIELD

The present application relates generally to the technical field of document processing. For example, an embodiment of the invention relates to a rule data for preflight profiles.

BACKGROUND

Preflight is a process that enables users to check a document for errors. The preflight involves the use of preflight profiles and associated preflight rules. An example of preflight features may be found in ADOBE® ACROBAT of Adobe Systems, Incorporated of San Jose, Calif. A preflight rule is a small bit of intelligence (and parameters) that looks for a particular kind of problem in a document. For example a rule may look for text that is too small. Such a rule might have two parameters which include whether to check the text and if the text is to be checked, whether the text is too small. The first parameter is the on/off state of the rule. The second parameter is a threshold value to determine whether the text is too small. Traditionally, custom dialog interface is created for each preflight rule. Interactions among parameters also need to be customized. Whenever a parameter needs to be changed, manual updating of the dialog interface is required.

BRIEF DESCRIPTION OF DRAWINGS

Some embodiments are illustrated by way of example and not limitation in the figures of the accompanying drawings in which:

FIG. 2 is a block diagram that illustrates an example of a how parameter data may be defined, in accordance with some example embodiments.

FIG. 5 is a block diagram that illustrates examples of control interfaces and parameters, in accordance with some example embodiments.

DETAILED DESCRIPTION

For some example embodiments, methods and systems to enable users to define preflight rule parameters are disclosed. In the following description, for purposes of explanation, numerous specific details are set forth in order to provide a thorough understanding of some example embodiments. It will be evident, however, to one skilled in the art that the present invention may be practiced without these specific details.

Overview

Figure 1A:
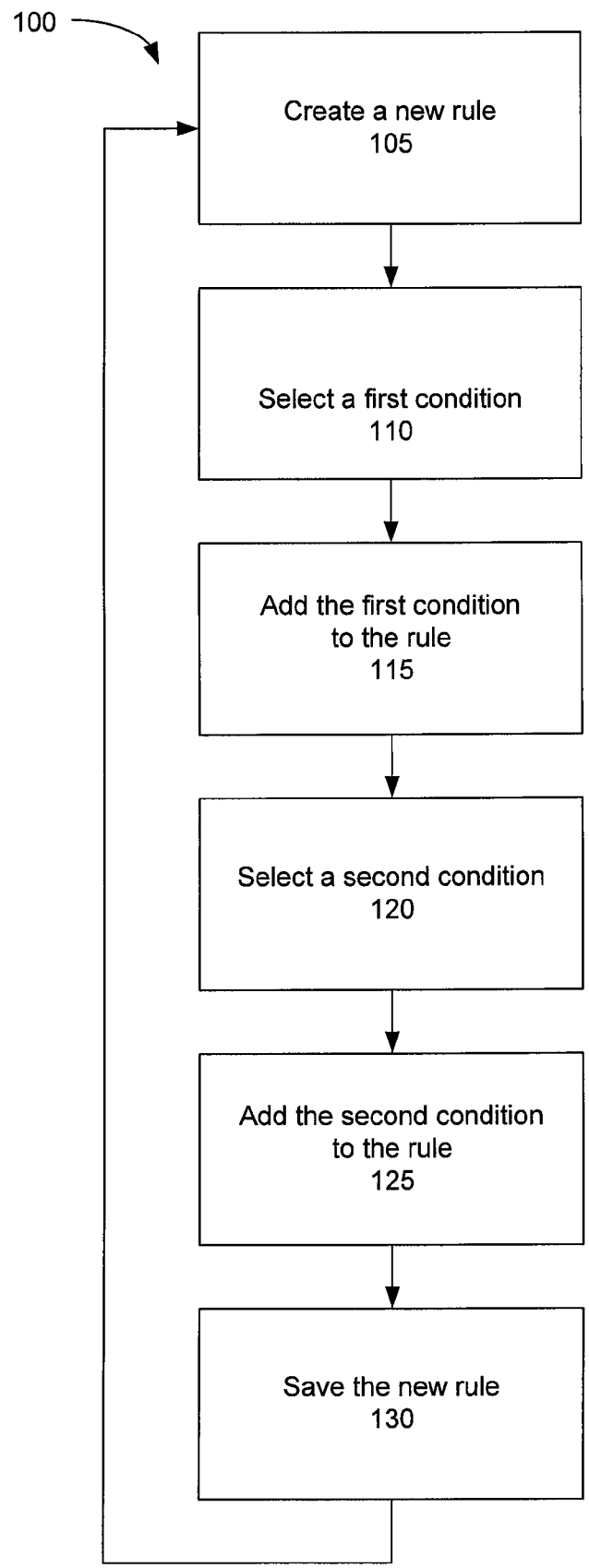
FIGS. 1A-1C illustrates examples of an existing method of creating preflight rules, in accordance with some example embodiments.
Figure 1B:
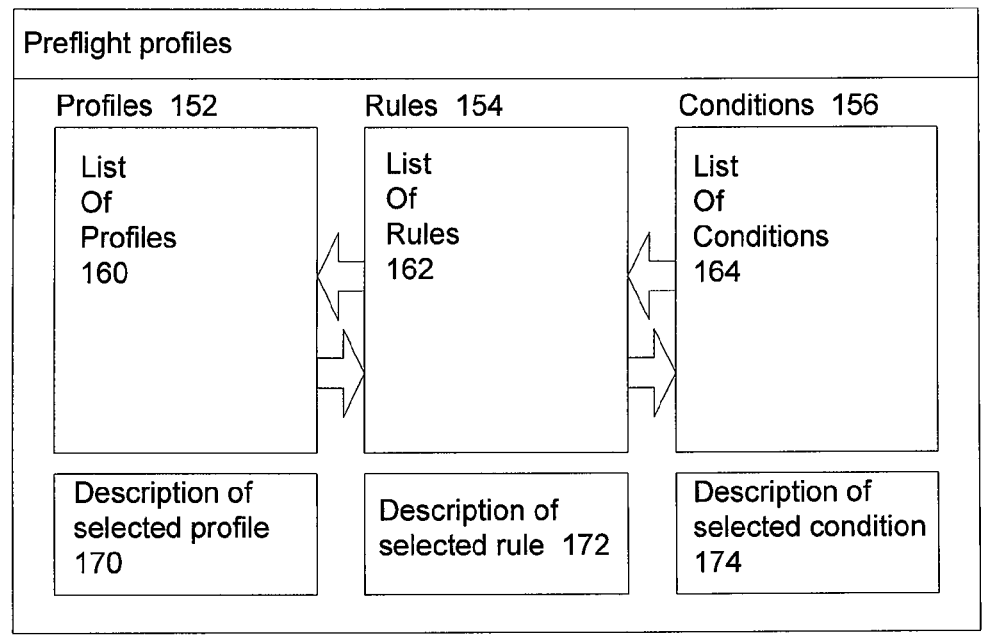
Figure 1C:
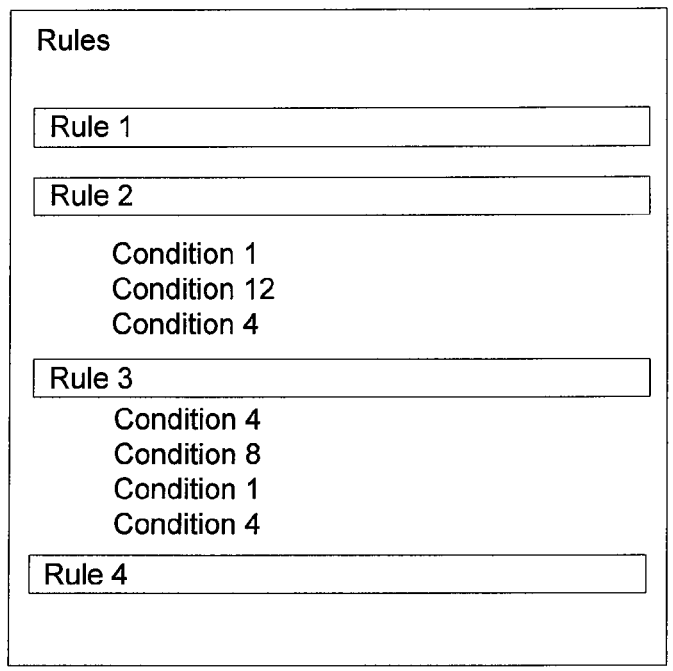

FIGS. 1A-1C illustrates examples of methods of creating preflight rules, in accordance with some example embodiments. Referring to flow diagram 100 of FIG. 1A, the existing method includes enabling a user to create a new preflight rule by selecting a "create" option (e.g., placing a mouse pointer on a "create" icon), as illustrated in block 105. Initially, the new preflight rule may be empty. The user may then add conditions to new the preflight rule. There may be a list of predefined conditions. The user may also create new conditions. The conditions may be associated with parameters and corresponding parameter values that are to be used for the preflight rule. Multiple conditions may be added, as illustrated in blocks 110-125. After completing adding the conditions, the preflight rule may be saved, as illustrated in block 130.

Referring to FIG. 1B, an interface may be used to create the preflight profiles, preflight rules, and preflight conditions. Interface 150 may include profile area 152, rule area 154 and condition area 156. When a profile is selected from the list of profiles 160, its description is displayed in the profile description area 170. When a rule is selected from the list of rules 162, its description is displayed in the rule description area 172. Similarly, when a condition is selected from the list of conditions 164, its description is displayed in the condition description area 174. The arrows in between the profile area 152, the rule area 154 and the condition area 156 are used to enable the user to copy a selection from one area to another area or to remove a selection from one area and returning it to another area. FIG. 1C illustrates a more detail example of the list of rules 162. There may be multiple rules including, for example, rule 1 to rule 4. A rule may not be associated with any conditions (e.g., rule 1 or rule 4), or it may be associated with multiple conditions (e.g., rule 2 or rule 3). A condition (e.g., condition 1 or condition 4) may be associated with multiple rules (e.g., rule 2 and rule 4). It may not be applicable to have two exactly similar conditions being associated with the same rule. When creating a new condition, a resource template may be used. The resource template may include multiple fields and input areas to enable the user to provide the necessary condition. A condition may be associated with one or more parameters and corresponding parameter value(s). One disadvantage of the method described in FIGS. 1A-1C is that when a condition is modified (e.g., adding a new parameter, changing or deleting an existing parameter), that modification is carried over to all the rules that are associated with that condition. For example, referring to FIG. 1C, when the condition 4 is modified for the rule 2, that modification also affects the rule 3 because the rule 3 is associated with the condition 4. Furthermore, when a condition is modified, the resource template may need to be redesigned. If relationship between conditions changes or if data type of parameters and parameter values change, the affected resource template and related implementation may have to be changed as well.

Dictionary-Based Parameter Definition

FIG. 2 is a block diagram that illustrates an example of how a parameter may be defined, in accordance with some example embodiments. Diagram 200 may include multiple sets of key, data type and value (referred to collectively as parameters). Key field 201 may represent a parameter identifier (or name) that may be associated with a preflight rule. Data type field 202 may represent format of the parameter. Value field 203 may represent the actual parameter value. This arrangement may be similar to a dictionary arrangement where each parameter identifier may be viewed as a word in the dictionary, and where the data type and the parameter value may be viewed as parts of the definition of the word. In the current example, the diagram 200 may represent parameters that are associated with a particular preflight rule. Here, there are parameters 205-225. The data type may be numeric (e.g., integer, real), Boolean, character string, range, etc. Other data types may also be used.

Flow Diagram—Create Preflight Rule

Figure 3:
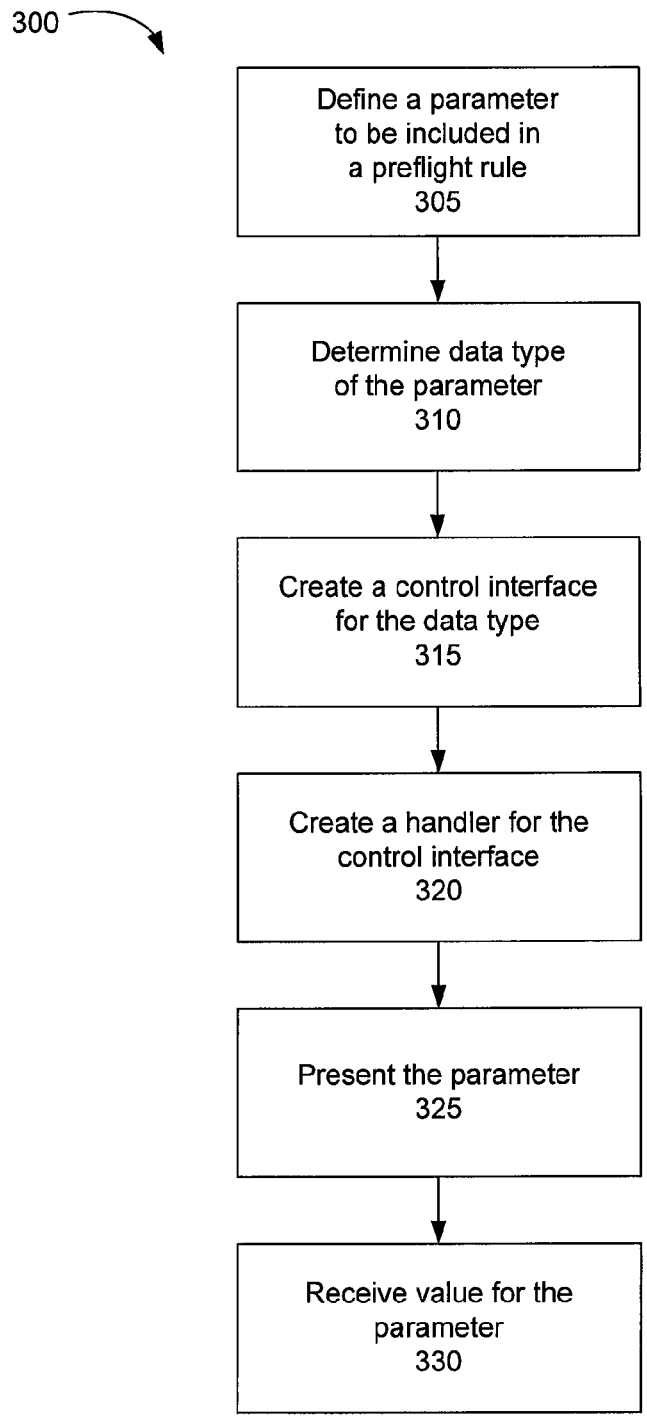
FIG. 3 is a flow diagram that illustrates an example of a process that may enable creating preflight rules, in accordance with some example embodiments.

FIG. 3 is a flow diagram that illustrates an example of a process 300 that may be used to create preflight rules, in accordance with some example embodiments. The parameter identifiers and their corresponding parameter values may be implemented using the dictionary approach described in FIG. 2. Initially, there may be zero parameter in a new preflight rule. New parameters may be added as they are defined, as illustrated in block 305. Each of the parameters may be associated with a data type. At block 310, a data type for the new parameter is determined.

Depending on the data type, different control interface may be used. The control interface may be a radio button, a check box, an input box, a pull-down list, etc. Resource templates may be used to define the control interfaces. This is determined and created at block 315. A parameter is typically associated with one control interface. For example, a parameter may be defined using a pull-down list or a check box. Each control interface may be associated with a handler, as illustrated in block 320. The handler may be a software routine (e.g., C++ software routine) that is responsible for implementing interactions that relate to the control interface and the parameter value. For example, when a control interface is a check box, and a user selects that checkbox, the handler may interpret the state of the check box as an affirmative message and may cause that affirmative message to be part of the associated parameter value.

At block 325, the parameter may be presented to a user. This may be via a user interface which may be automatically displayed or presented to a user when a preflight profile is being defined. The interface may include one or more rules that the user may select. The interface (also referred to as a rule interface) may be automatically generated because the rules, the parameters, the parameters' data types been defined. It may be noted that parameter relationship (described below) may have also been defined. At block 330, one or more parameter values are received. The parameter values may be provided by a user. For example, the user may select a radio button, or select and check box associated with the parameter. It may be noted that the user may be an end user, a user that creates the preflight rule, or both.

Parameter Relationship

Figure 4:
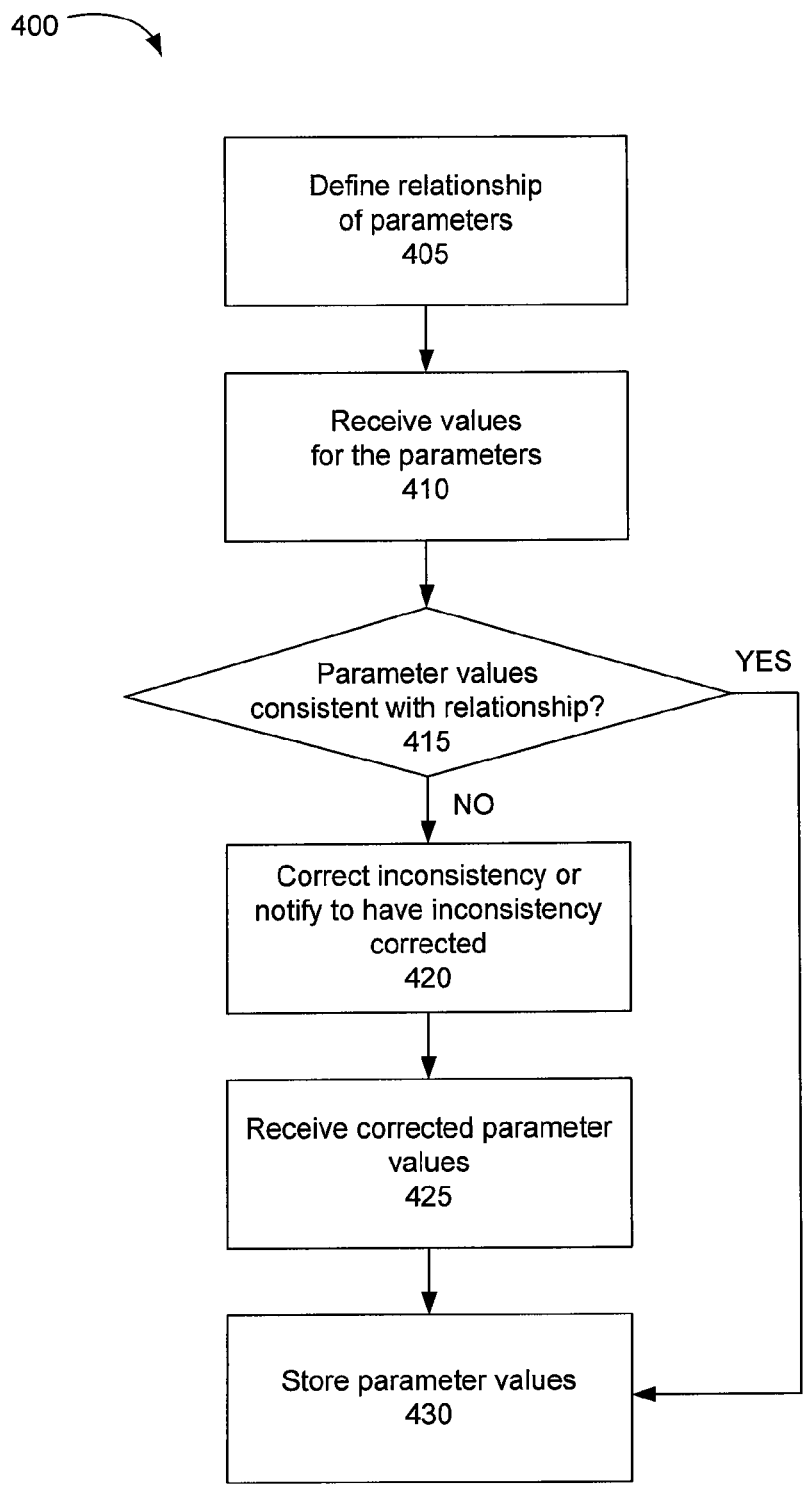
FIG. 4 is a flow diagram that illustrates a process that may be used to maintain consistency of relationship among related parameters, in accordance with some example embodiments.

FIG. 4 is a flow diagram that illustrates a process 400 that may be used to maintain consistency of relationship among related parameters, in accordance with some example embodiments. At block 405, relationship among the parameters may be defined. This may be performed during the time when the parameters themselves are defined. Alternatively, it may be performed after the parameters are defined. It may be noted that two or more parameters associated with the same rule may be related. Their relationship may be associated with constraints in parameter values, data type, etc. At block 410, the parameter values for the parameters are received. At block 415, a test is made to determine if the parameter values are consistent according to any relationship that the parameters may have with other parameters. If the parameter values are consistent according to its relationship, then the parameter values are stored, as illustrated in block 430. However, if there is inconsistency, the process may flow from block 415 to block 420 where correction may be made. This may include, for example, notifying a user that the parameter values are incorrect or inconsistent with other parameter values. At block 425, the corrected parameter values are received. At block 430, the parameter values are stored.

Control Interfaces and Parameter Examples

FIG. 5 is a block diagram that illustrates examples of parameter interfaces and control interfaces, in accordance with some example embodiments. Block 500 illustrates an example of edit box control interfaces. FIG. 5 includes a group of three different parameters represented by blocks 500, 510 and 520. The block 500 may be associated with a parameter that is related to margin settings. As illustrated, this parameter is set since check box 501 is activated. The block 500 includes four edit boxes to enable a user to provide parameter values associated with top, bottom, left/inside, and right/outside. The parameter values in this example may be associated with the "character string" data type. Block 510 illustrates an example of check box control interfaces. The block 510 may be associated with a parameter that is related to "color spaces and modes" settings. As illustrated, this parameter is set since check box 511 is activated. The block 510 includes multiple check boxes to enable a user to select a color option. In the current example, the CMYK color option is set causing that information to become part of the parameter value. Block 520 illustrates an example of the pull down list control interface. The block 520 may be associated with a parameter that is related to document settings. This parameter is set since the check box 521 is activated. The block 520 also includes a check box for number of required pages and related pull down list (illustrated by arrow 522). Other control interfaces are all illustrated in the block 520. From FIG. 5, it may be noted that defining the parameters represented by the blocks 500, 510 and 520 may include determining the data type and determining the control interfaces to be used with the data type. This may also include defining the relationship of the parameters. Once the parameters are defined, they may become available for the end users to select and to include the parameters in one or more preflight rules. For example, the end user may place a check mark in the check box 501 and other values in the appropriate input boxes to include the "margin" parameter in a preflight rule.

Preflight Rule Modules

Figure 6:
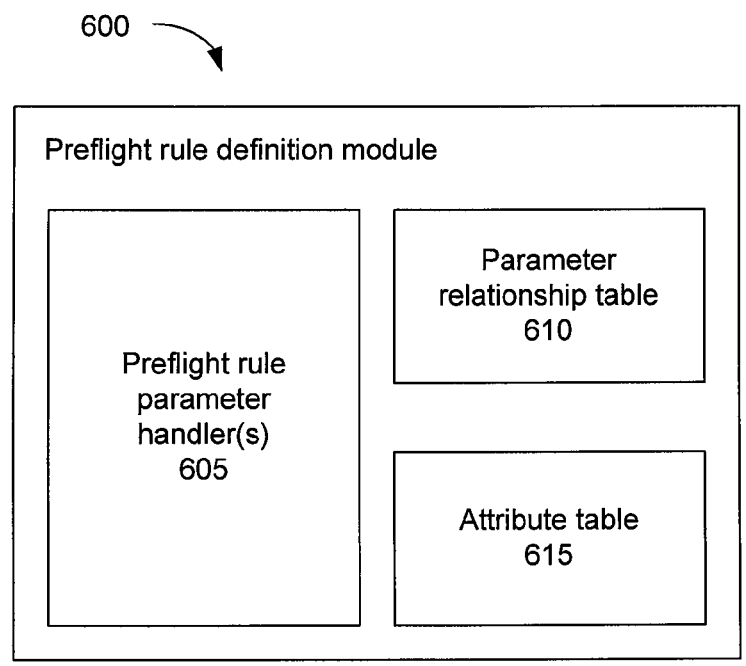
FIG. 6 is a block diagram that illustrates functional modules that may be used to enable defining the preflight rules, in accordance with some example embodiments.

FIG. 6 is a block diagram that illustrates functional modules that may be used to define the preflight rules, in accordance with some example embodiments. Preflight rule definition module 600 may include preflight rule parameter handlers 605, parameter relationship table 610, and attribute table 615. The preflight rule parameter handlers 605 may be responsible for managing the preflight rule user interface and the interactions between a user and the preflight rule user interface. For example, the preflight rule parameter handlers 605 may cause the preflight rule user interface to be displayed when a request to define a new preflight rule is received. Depending on how a user wants to define a parameter, the preflight rule parameter handlers 605 may implement various control interfaces (e.g., check boxes, input boxes, dropdown list, range, etc.). There may be multiple preflight rule parameter handlers 605, and there may be a different preflight rule parameter handler for each data type.

The user may also enter parameter relationship information. The preflight rule parameter handlers 605 may store the parameter relationship information in the parameter relationship table 610. The parameter relationship information may be used by the preflight rule parameter handlers 605 to check for consistency. When the user completes defining the parameters for a preflight rule, information about the parameters may be stored in the attribute table 615. For some example embodiments, default values may be assigned to some of the parameters.

Attribute Tables

Figure 7:
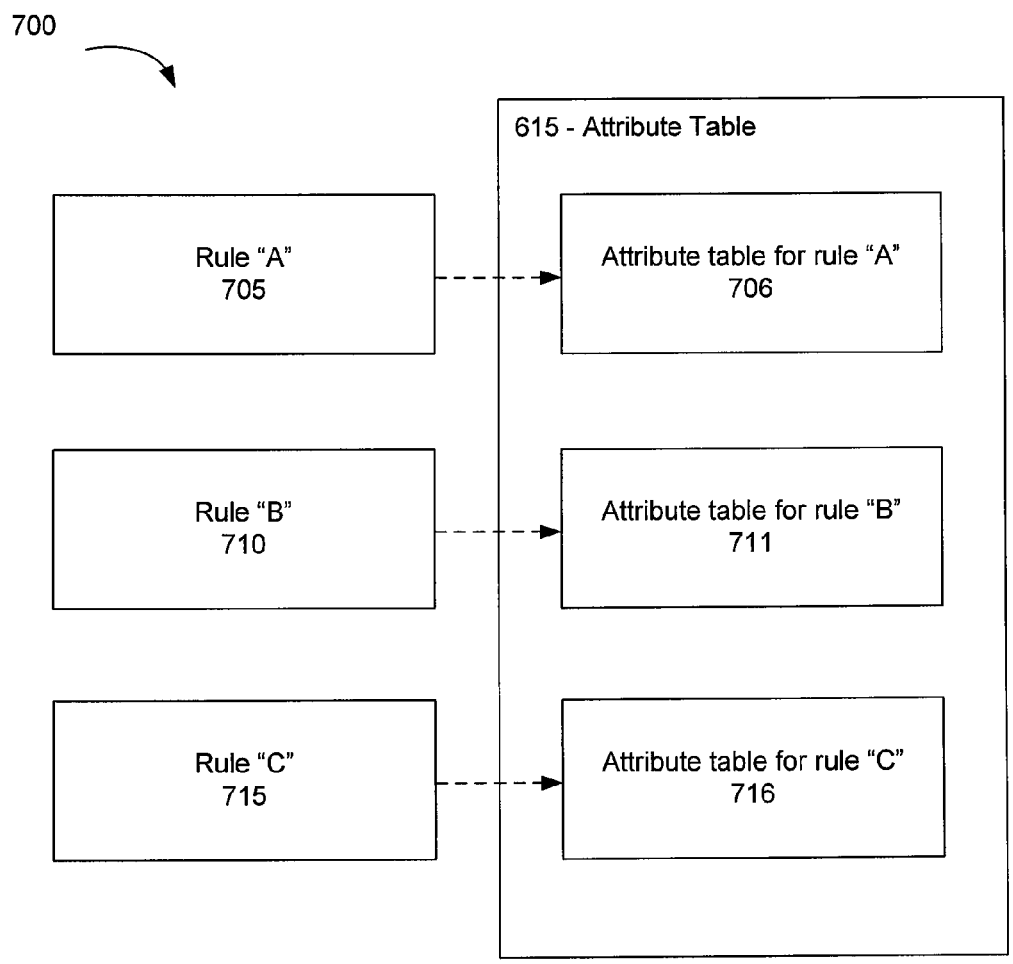
FIG. 7 is a block diagram that illustrates the attribute tables, in accordance with some example embodiments.

FIG. 7 is a block diagram that illustrates the attribute tables, in accordance with some example embodiments. Diagram 700 includes blocks 705-715 that represent Rule "A" to Rule "C", respectively. For some example embodiments, each preflight rule may be associated with a unique attribute table. For example, a first attribute table 706 may include a summary of a first set parameters associated with the preflight rule "A" 705; a second attribute table 711 may include a summary of a second set of parameters associated with the second preflight rule "B" 710; a third attribute table 716 may include a summary of a third set of parameters associated with the third preflight rule "C" 715. When the user subsequently wants to modify or view a preflight rule (e.g., adding new parameter value, modifying existing parameter value, reviewing existing parameter value), content of the related attribute table may be retrieved.

Flow Diagram—Modify Preflight Rule

Figure 8:
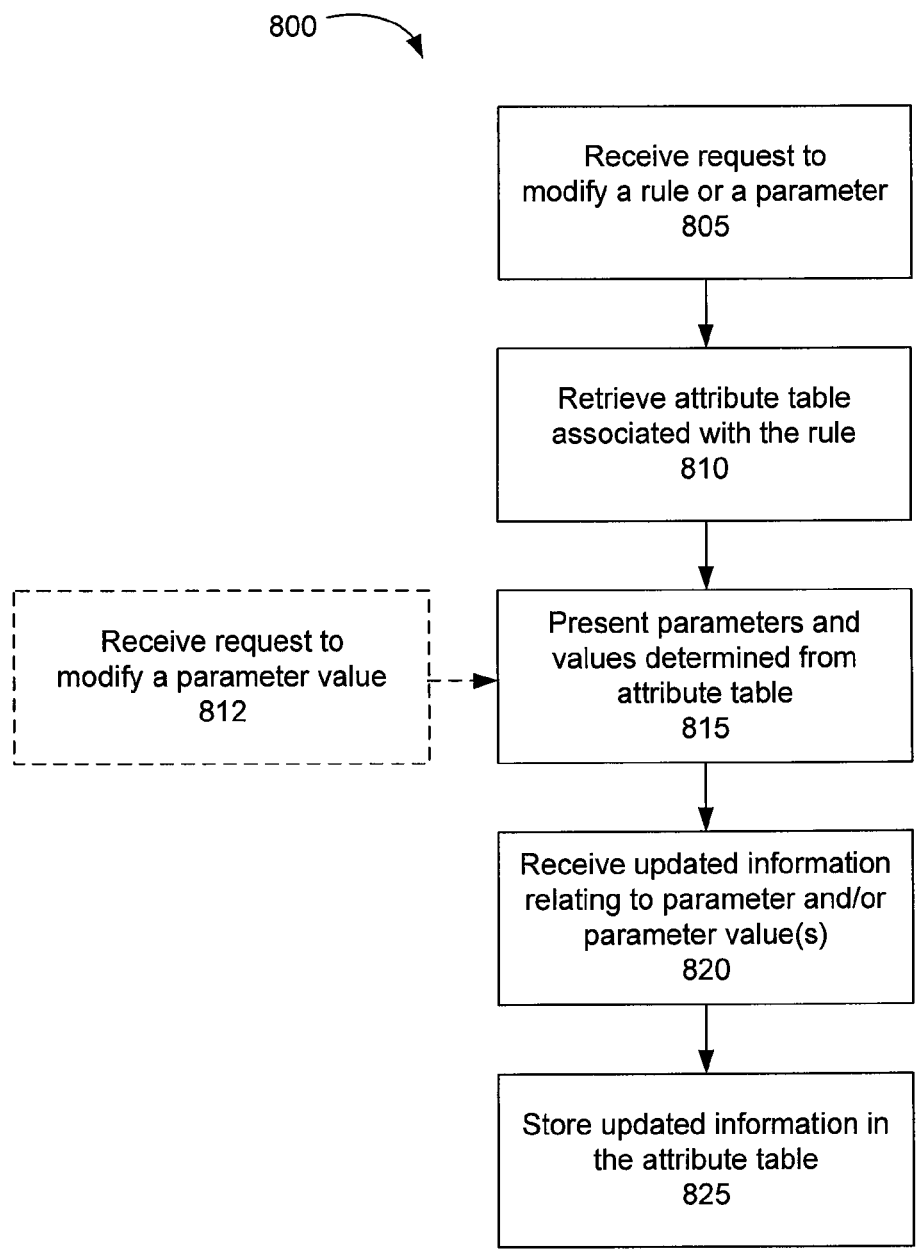
FIG. 8 is a flow diagram that illustrates a process that may be used to modify a preflight rule or a preflight parameter, in accordance with some example embodiments.

FIG. 8 is a flow diagram that illustrates a process 800 that may be used to modify a preflight rule, in accordance with some example embodiments. The process may start at block 805, where a request is received to modify an existing preflight rule. At block 810, the attribute table associated with the preflight rule may be retrieved. The attribute table may include a summary of the parameters and parameter values associated with the parameters included in the preflight rule. At block 815, the parameters and their associated parameter value may be displayed. This may be performed by the preflight rule parameter handlers 605 described in FIG. 6. The parameter values may be displayed via a parameter interface. Examples of the parameter interfaces include those described in FIG. 5. It may be noted that a rule interface may include one or more parameter interfaces. For example, a rule interface may include the parameter interfaces illustrated in blocks 500, 510 and 520 of FIG. 5.

It may be noted that the process of FIG. 8 may be used to modify the structure of the preflight rule (e.g., adding new parameter, deleting existing parameter, modifying parameter data type, modifying parameter relationship information, etc.). It may be noted that the process of FIG. 8 may also be used to modify one or more parameter values. This situation is illustrated in block 812, when a request to modify a parameter value is received. The process then continues to block 815. At block 820, updated parameters and/or parameter values are received. The updated parameters and/or parameter values may be provided by a user via the parameter interface.

At block 825, the updated parameters and/or parameter values are stored in the attribute table. It may be noted that although the methods and systems described herein may relate to embodiments of defining preflight rules, the methods and systems may also be applicable to other areas where there are similar requirements of defining parameters and parameter values in which they can be implemented using sets of key, data type and values and the dictionary approach.

Modules, Components and Logic

Certain embodiments are described herein as including logic or a number of components, modules, or mechanisms. A component may be a tangible unit capable of performing certain operations and is configured or arranged in a certain manner. In example embodiments, one or more computer systems (e.g., a standalone, client or server computer system) or one or more components of a computer system (e.g., a processor or a group of processors) may be configured by software (e.g., an application or application portion) as a "component" that operates to perform certain operations as described herein.

In various embodiments, a "component" may be implemented mechanically or electronically. For example, a component may comprise dedicated circuitry or logic that is permanently configured (e.g., within a special-purpose processor) to perform certain operations. A component may also comprise programmable logic or circuitry (e.g., as encompassed within a general-purpose processor or other programmable processor) that is temporarily configured by software to perform certain operations. It will be appreciated that the decision to implement a component mechanically, in dedicated and permanently configured circuitry, or in temporarily configured circuitry (e.g., configured by software) may be driven by cost and time considerations.

Accordingly, the term "component" should be understood to encompass a tangible entity, be that an entity that is physically constructed, permanently configured (e.g., hardwired) or temporarily configured (e.g., programmed) to operate in a certain manner and/or to perform certain operations described herein. Considering embodiments in which components are temporarily configured (e.g., programmed), each of the components need not be configured or instantiated at any one instance in time. For example, where the components comprise a general-purpose processor configured using software, the general-purpose processor may be configured as respective different components at different times. Software may accordingly configure a processor, for example, to constitute a particular component at one instance of time and to constitute a different component at a different instance of time.

Components can provide information to, and receive information from, other components. Accordingly, the described components may be regarded as being communicatively coupled. Where multiple of such components exist contemporaneously, communications may be achieved through signal transmission (e.g., over appropriate circuits and buses) that connect the components. In embodiments in which multiple components are configured or instantiated at different times, communications between such components may be achieved, for example, through the storage and retrieval of information in memory structures to which the multiple components have access. For example, a one component may perform an operation, and store the output of that operation in a memory device to which it is communicatively coupled. A further component may then, at a later time, access the memory device to retrieve and process the stored output.

Components may also initiate communications with input or output devices, and can operate on a resource (e.g., a collection of information).

The term "module", as used herein, should be understood to refer more broadly to a tangible component or a software component, or any combination thereof. Accordingly, a module may be implemented in electronic circuitry, hardware, firmware, software or a combination thereof.

Electronic, Apparatus and System

Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry, e.g., an FPGA (field programmable gate array) or an ASIC (application-specific integrated circuit).

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that that both hardware and software architectures require consideration. Specifically, it will be appreciated that the choice of whether to implement certain functionality in permanently configured hardware (e.g., an ASIC), in temporarily configured hardware (e.g., a combination of software and a programmable processor), or a combination permanently and temporarily configured hardware may be a design choice. Below are set out hardware (e.g., machine) and software architectures that may be deployed, in various example embodiments.

Example Machine Architecture and Machine-Readable Medium

Figure 9:
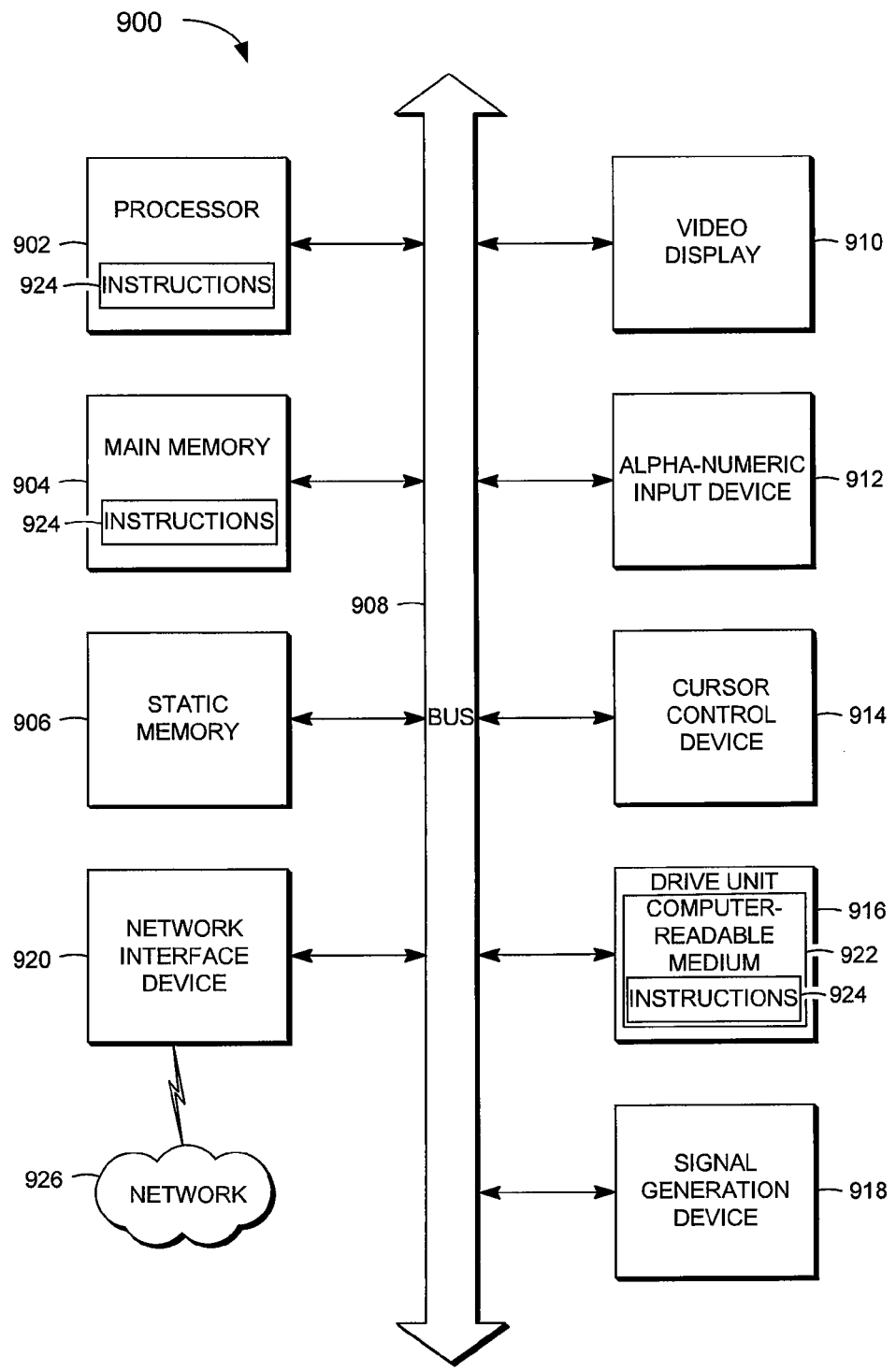
FIG. 9 is a block diagram of machine in the example form of a computer system within which instructions, for causing the machine to perform any one or more of the methodologies discussed herein, may be executed, in accordance with some example embodiments.

FIG. 9 is a block diagram of machine in the example form of a computer system within which instructions, for causing the machine to perform any one or more of the methodologies discussed herein, may be executed, in accordance with some example embodiments. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch, or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 900 includes a processor 902 (e.g., a central processing unit (CPU), a graphics processing unit (GPU) or both), a main memory 904 and a static memory 906, which communicate with each other via a bus 908. The computer system 900 may further include a video display unit 910 (e.g., liquid crystal display (LCD) or a cathode ray tube (CRT)). The computer system 900 also includes an alphanumeric input device 912 (e.g., a keyboard), a user interface (UI) navigation device 914 (e.g., a mouse), a disk drive unit 916, a signal generation device 918 (e.g., a speaker) and a network interface device 920.

Machine-Readable Medium

The disk drive unit 916 includes a machine-readable medium 922 on which is stored one or more sets of instructions and data structures (e.g., software 924) embodying or utilized by any one or more of the methodologies or functions described herein. The software 924 may also reside, completely or at least partially, within the main memory 904 and/or within the processor 902 during execution thereof by the computer system 900, the main memory 904 and the processor 902 also constituting machine-readable media.

While the machine-readable medium 922 is illustrated in an example embodiment to be a single medium, the term "machine-readable medium" may include a single medium or multiple media (e.g., a centralized or distributed database, and/or associated caches and servers) that store the one or more instructions. The term "machine-readable medium" shall also be taken to include any tangible medium that is capable of storing, encoding or carrying instructions for execution by the machine and that cause the machine to perform any one or more of the methodologies of the present invention, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., EPROM, EEPROM, and flash memory devices; magnetic disks such as internal hard disks and removable disks; magneto-optical disks; and CD-ROM and DVD-ROM disks.

Transmission Medium

The software 924 may further be transmitted or received over a communications network 926 using a transmission medium via the network interface device 920 utilizing any one of a number of well-known transfer protocols (e.g., HTTP). Examples of communication networks include a local area network ("LAN"), a wide area network ("WAN"), the Internet, mobile telephone networks, Plain Old Telephone (POTS) networks, and wireless data networks (e.g., WiFi and WiMax networks) The term "transmission medium" shall be taken to include any intangible medium that is capable of storing, encoding or carrying instructions for execution by the machine, and includes digital or analog communications signals or other intangible medium to facilitate communication of such software.

Although an embodiment has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments illustrated. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A computer-implemented method of defining preflight rules for preflight profiles, the method comprising:
    defining a first parameter and a second parameter to be included in a preflight rule, the defining of the first parameter and the second parameter including defining a data type for each of the first parameter and the second parameter, the data type representing a format of the first or the second parameter;
    creating a control interface based on at least one of the defined data types representing the format of the first or second parameter;
    defining relationship information between the first parameter and the second parameter in the preflight rule, the relationship information placing constraints on parameter values for the first parameter and the second parameter in the preflight rule to maintain consistency between the first parameter and second parameter, the relationship information suitable for use by at least one handler to check for the consistency in the parameter values for the first parameter and the second parameter in the preflight rule;
    storing the relationship information to a relationship table that is accessible by the at least one handler to check for the consistency in the parameter values for the first parameter and the second parameter in the preflight rule;
    creating attribute information for the preflight rule, the attribute information comprising a summary of the first parameter and the second parameter; and
    storing the attribute information for the preflight rule in an attribute table uniquely associated with the preflight rule.

2. The computer-implemented method of claim 1, wherein the data type include a selection from one of a numeric data type, a character string data type, and a Boolean data type.

3. The computer-implemented method of claim 1, wherein the first parameter and the second parameter are defined using at least one created control interface.

4. The computer-implemented method of claim 1, wherein the control interface includes at least one of a radio button, a check box, an input box, or a pull down list.

5. The computer-implemented method of claim 1, further comprising creating a handler for the control interface.

6. The computer-implemented method of claim 5, wherein the handler is to implement and manage interactions related to the control interface associated with the first parameter or the second parameter.

7. The computer-implemented method of claim 1, further comprising: enabling a value associated with the first parameter or the second parameter to be modified when the value is inconsistent with the relationship information between the first parameter and the second parameter.

8. A non-transitory machine-readable medium having instructions that, when executed by processor, cause a machine to perform operations including:
    creating and storing a first set of attribute information associated with a first preflight rule in an attribute table uniquely associated with the first preflight rule, the first set comprising a summary of at least a first parameter, a second parameter, and a data type of the first parameter and a data type of the second parameter, the data type of the first parameter and data type of the second parameter representing a format of the first parameter and a format of the second parameter;
    defining relationship information between the first parameter and the second parameter in the preflight rule, the relationship information placing constraints on parameter values for the first parameter and the second parameter in the preflight rule to maintain consistency between the first parameter and second parameter in the preflight rule, the relationship information stored to a relationship table that is suitable for use by at least one handler to check for consistency between the parameter values for the first parameter and the second parameter in the preflight rule; and
    responsive to receiving a request to modify the first preflight rule:
        creating a control interface based on at least one of the defined data types representing the format of the first or the second parameter;
        presenting the first parameter or the second parameter using the control interface;
        receiving updated information related to at least one of the first parameter or the second parameter;
        storing the updated information in the attribute table uniquely associated with the first preflight rule, the updated information including at least one of a parameter or a parameter value; and
        generating an updated first set of attribute information using the received updated information.

9. The non-transitory machine-readable medium of claim 8, wherein each of the first parameter or the second parameter is defined based on a data type and a control interface.

10. The non-transitory machine-readable medium of claim 9, wherein the first parameter and the second parameter are available to be included in a second preflight rule, and wherein the second preflight rule is associated with a second set of attribute information stored in a second attribute table.

11. The non-transitory machine-readable medium of claim 10, wherein said generating of the updated first set of attribute information does not affect the second set of attribute information.

12. A computer-implemented method, comprising:
defining a first parameter and a second parameter to be included in a preflight rule, the defining of the first parameter and the second parameter including defining a data type for each of the first parameter and the second parameter, the data type representing a format of the first or the second parameter;
creating a control interface based on at least one of the defined data types representing the format of the first or the second parameter;
receiving parameter values using the control interface;
creating and storing attribute information associated with the preflight rule into an attribute table uniquely associated with the preflight rule, the attribute information including a summary of the first parameter, the second parameter, and their corresponding data types and values;
defining relationship information between the first parameter and the second parameter in the preflight rule, the relationship information suitable for use by at least one handler to check for the consistency between parameter values of the first parameter and the second parameter in the preflight rule; and
responsive to receiving a request to view the preflight rule, retrieving the attribute information stored in the attribute table to present the first parameter and the second parameter.

13. The computer-implemented method of claim 12, wherein said request to view the preflight rule includes a request to modify the preflight rule.

14. The computer-implemented method of claim 12, wherein the first parameter and the second parameter are defined using a dictionary-based approach.

15. A system, comprising:
means for defining preflight parameters based on data types representing respective formats of the preflight parameters;
means for creating a control interface for the preflight parameters based on at least one of the defined data types representing the respective formats of the preflight parameters;
means for defining relationship information among the preflight parameters, the relationship information placing constraints on parameter values for the preflight parameters in the preflight rule to maintain consistency between the preflight parameters, the relationship information being used by at least one handler to check for the consistency;
means for storing the relationship information to a relationship table that is accessible by the at least one handler to check for the consistency between parameter values of the first parameter and the second parameter in the preflight rule;
means for generating, using at least one processor, attribute information summarizing the preflight parameters, the data types, and parameter values associated with the preflight parameters; and
means for storing the attribute information for the preflight parameters in an attribute table uniquely associated with the preflight parameters from among a plurality of attribute tables.

16. The system of claim 15, wherein said means for defining the preflight parameters comprises means for defining the control interface associated with the data types.

17. The system of claim 15, further comprising means for managing interactions related to the control interface.

18. The system of claim 15, further comprising:
means for presenting the preflight parameters;
means for receiving updated preflight parameters; and
means for updating the attribute information based on said updated preflight parameters.

19. The method of claim 1, wherein each data type is managed by a different handler.

* * * * *

UNITED STATES PATENT AND TRADEMARK OFFICE
CERTIFICATE OF CORRECTION

| | | |
|---|---|---|
| PATENT NO. | : 8,484,557 B1 | Page 1 of 1 |
| APPLICATION NO. | : 12/181641 | |
| DATED | : July 9, 2013 | |
| INVENTOR(S) | : Susan Cheng | |

It is certified that error appears in the above-identified patent and that said Letters Patent is hereby corrected as shown below:

In the Claims:

In column 9, line 61, in Claim 1, after "and", insert --the--, therefor

In column 10, line 26, in Claim 7, after "comprising:" insert --¶--, therefor

Signed and Sealed this
Third Day of December, 2013

Margaret A. Focarino
*Commissioner for Patents of the United States Patent and Trademark Office*